United States Patent
Honji

(10) Patent No.: US 11,546,679 B2
(45) Date of Patent: Jan. 3, 2023

(54) SPEAKER SYSTEM AND VEHICLE DOOR THEREWITH

(71) Applicant: Yamaha Corporation, Hamamatsu (JP)

(72) Inventor: Yoshikazu Honji, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 69 days.

(21) Appl. No.: 17/072,230

(22) Filed: Oct. 16, 2020

(65) Prior Publication Data

US 2021/0051385 A1 Feb. 18, 2021

Related U.S. Application Data

(63) Continuation of application No. PCT/JP2018/015864, filed on Apr. 17, 2018.

(51) Int. Cl.
*H04R 1/02* (2006.01)
*B60J 5/04* (2006.01)
(Continued)

(52) U.S. Cl.
CPC .......... *H04R 1/025* (2013.01); *B60J 5/0413* (2013.01); *B60R 11/0217* (2013.01);
(Continued)

(58) Field of Classification Search
CPC .... H04R 1/025; H04R 2499/13; B60J 5/0413; B60R 11/0217; B60R 13/0243; B60R 13/0815; B60R 2011/0021
See application file for complete search history.

(56) References Cited

U.S. PATENT DOCUMENTS 6,226,927 B1 * 5/2001 Bertolini ............. H04R 1/2819
181/150
6,843,345 B2 * 1/2005 Koizumi ................. H04R 1/025
181/150
(Continued)

FOREIGN PATENT DOCUMENTS

JP 2009-137416 A 6/2009
JP 2010-97149 A 4/2010
WO WO 2009/144818 A1 12/2009

OTHER PUBLICATIONS

English Translation of WO 2009/144818 A1 "Takahashi", Publication Date: Mar. 12, 2009.*
(Continued)

*Primary Examiner* — Jason R Kurr
(74) *Attorney, Agent, or Firm* — Crowell & Moring LLP

(57) ABSTRACT

A speaker system includes a first panel, a second panel, a third panel, a speaker unit, and a sound absorber. The first panel is an outer panel constituting a part of a vehicle door of a vehicle having a compartment. The second panel constitutes a part of the vehicle door and is situated closer to the compartment than the first panel and has an opening. The third panel constitutes a part of the vehicle door and resides between the first panel and the second panel. The speaker unit overlaps the opening in a plan view when viewed from the compartment along a central axis of the speaker unit and outputs sound toward the compartment. The sound absorber is arranged at a location corresponding to an anti-node of particle velocity in a standing wave generated in a space defined between the speaker unit and the first panel.

7 Claims, 5 Drawing Sheets

(51) Int. Cl.
*B60R 11/02* (2006.01)
*B60R 13/02* (2006.01)
*B60R 13/08* (2006.01)
*B60R 11/00* (2006.01)

(52) U.S. Cl.
CPC ...... B60R 13/0243 (2013.01); B60R 13/0815 (2013.01); *B60R 2011/0021* (2013.01); *H04R 2499/13* (2013.01)

(56) References Cited

U.S. PATENT DOCUMENTS

| 8,739,921 | B1 | 6/2014 | Larson | |
|---|---|---|---|---|
| 2005/0013459 | A1* | 1/2005 | Maekawa | B60R 11/0217 381/349 |
| 2008/0150324 | A1* | 6/2008 | Jayasuriya | B60R 11/0217 296/187.12 |
| 2014/0086444 | A1* | 3/2014 | Muller | B60J 5/0413 381/389 |

OTHER PUBLICATIONS

International Search Report (PCT/ISA/210) issued in PCT Application No. PCT/JP2018/015864 dated Jun. 5, 2018 with English translation (two (2) pages).
Japanese-language Written Opinion (PCT/ISA/237) issued in PCT Application No. PCT/JP2018/015864 dated Jun. 5, 2018 (three (3) pages).
Japanese-language Office Action issued in Japan Application No. 2020-514825 dated Aug. 10, 2021 with English translation (5 pages).
Japanese-language Office Action issued in Japanese Application No. 2020-514825 dated Mar. 1, 2022 with English translation (nine (9) pages).

* cited by examiner

SPEAKER SYSTEM AND VEHICLE DOOR THEREWITH

CROSS-REFERENCE TO RELATED APPLICATION

This application is a Continuation Application of PCT Application No. PCT/JP2018/015864, filed on Apr. 17, 2018, the entire contents of each of which are incorporated herein by reference.

BACKGROUND

Technical Field

The present disclosure relates to a speaker system and to a vehicle door in which the speaker system is disposed.

Background Information

A vehicle door includes an outer panel, a door trim, and an inner panel arranged between the outer panel and the door trim. On the inner panel, a door functional component, such as a speaker unit or a window, is mounted. For example, Japanese Patent Application Laid-Open Publication No. 2009-137416 discloses a vehicle door including a door functional component that is mounted on a module carrier plate. The module carrier plate may be attached to an inner panel so as to seal a through hole of the inner panel. On the module carrier plate, a speaker unit may be mounted. In a vehicle door that houses a speaker unit, a space surrounded by both a door trim and an outer panel functions as an enclosure for the speaker unit.

In a conventional speaker system having a speaker unit that is incorporated in a vehicle door, a standing wave is generated in the vehicle door. The generation of a standing wave causes reduction in pressure of, in sound output to a compartment, sound components at a frequency identical to the frequency of the standing wave. In addition, when a speaker unit receives an input signal that includes frequency components of a standing wave up to a certain point in time, but that no longer includes the frequency components of the standing wave after the certain point, the frequency components of the standing wave in sound output based on the signal do not immediately disappear even after the certain point because it takes time for the frequency components of the standing wave to attenuate.

SUMMARY

The present disclosure has been made in view of the above-described circumstances. An object of the present disclosure is to provide a speaker system capable of reducing generation of a standing wave in a vehicle door to improve sound quality, and provide a vehicle door for housing the speaker system.

In one aspect, a speaker system includes a first panel being an outer panel that constitutes a first part of a vehicle door of a vehicle having a compartment, a second panel that constitutes a second part of the vehicle door, the second panel being situated closer to the compartment than the first panel and having an opening for outputting sound, a third panel that constitutes a third part of the vehicle door, the third panel disposed between the first panel and the second panel, a speaker unit that overlaps the opening in a plan view when viewed from the compartment along a central axis of the speaker unit, the speaker unit outputting sound toward the compartment, and a sound absorber that is arranged at a location corresponding to an anti-node of particle velocity in a standing wave that is generated in a space defined between the speaker unit and the first panel.

In another aspect, a vehicle door includes the speaker system described above. Other objects, advantages and novel features of the embodiments of the present invention will become apparent from the following detailed description of one or more preferred embodiments when considered in conjunction with the accompanying drawings, in which:

DETAILED DESCRIPTION

Hereafter, an embodiment according to the present disclosure will be described with reference to the figures. In the following figures, dimensions and scales of elements may be different from those of actual products. Embodiments described below are examples of the present disclosure. The scope of the present disclosure is not limited to the embodiments described below.

Figure 1:
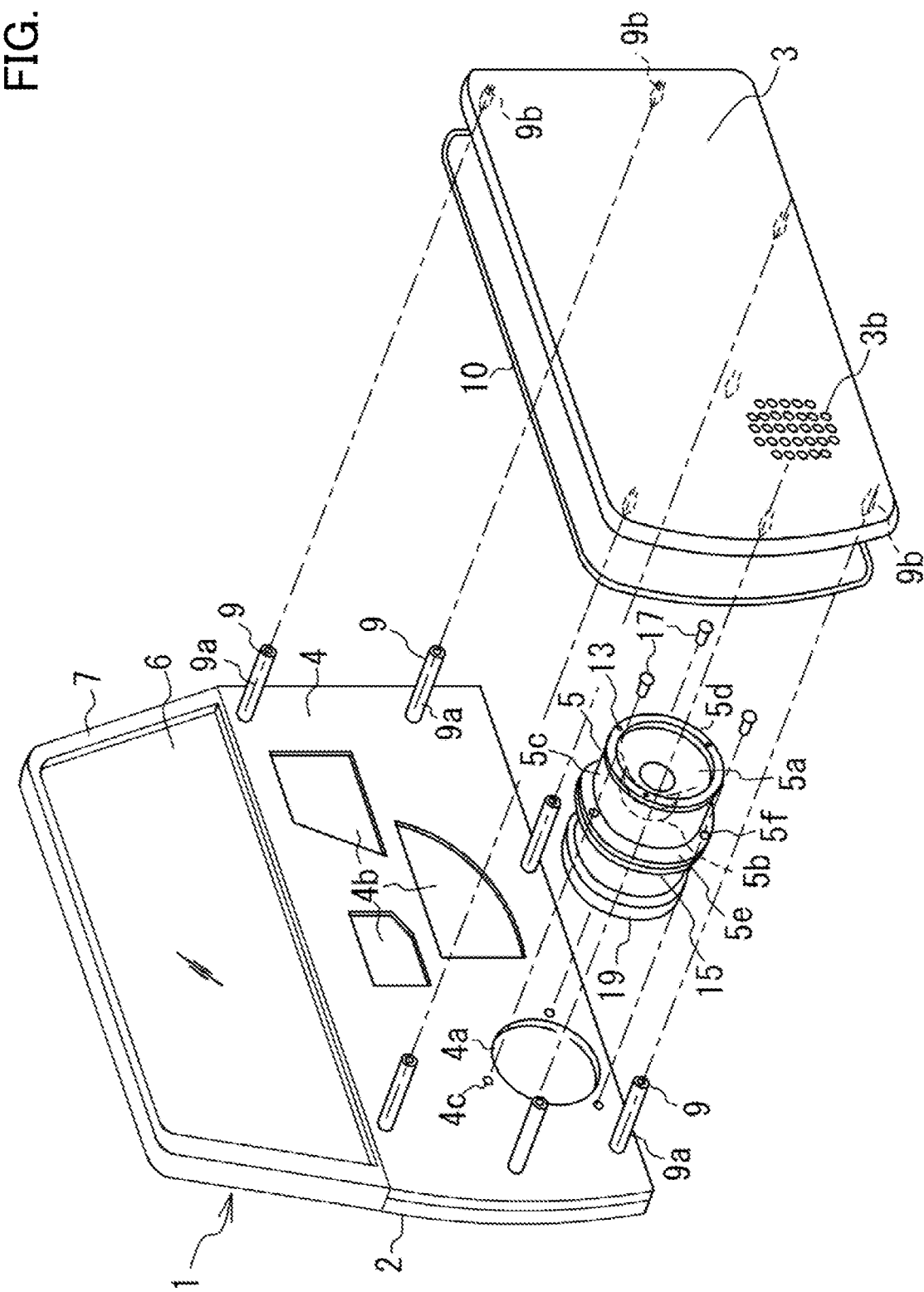
FIG. 1 is an exploded perspective view showing a vehicle door including a speaker system.
Figure 2:
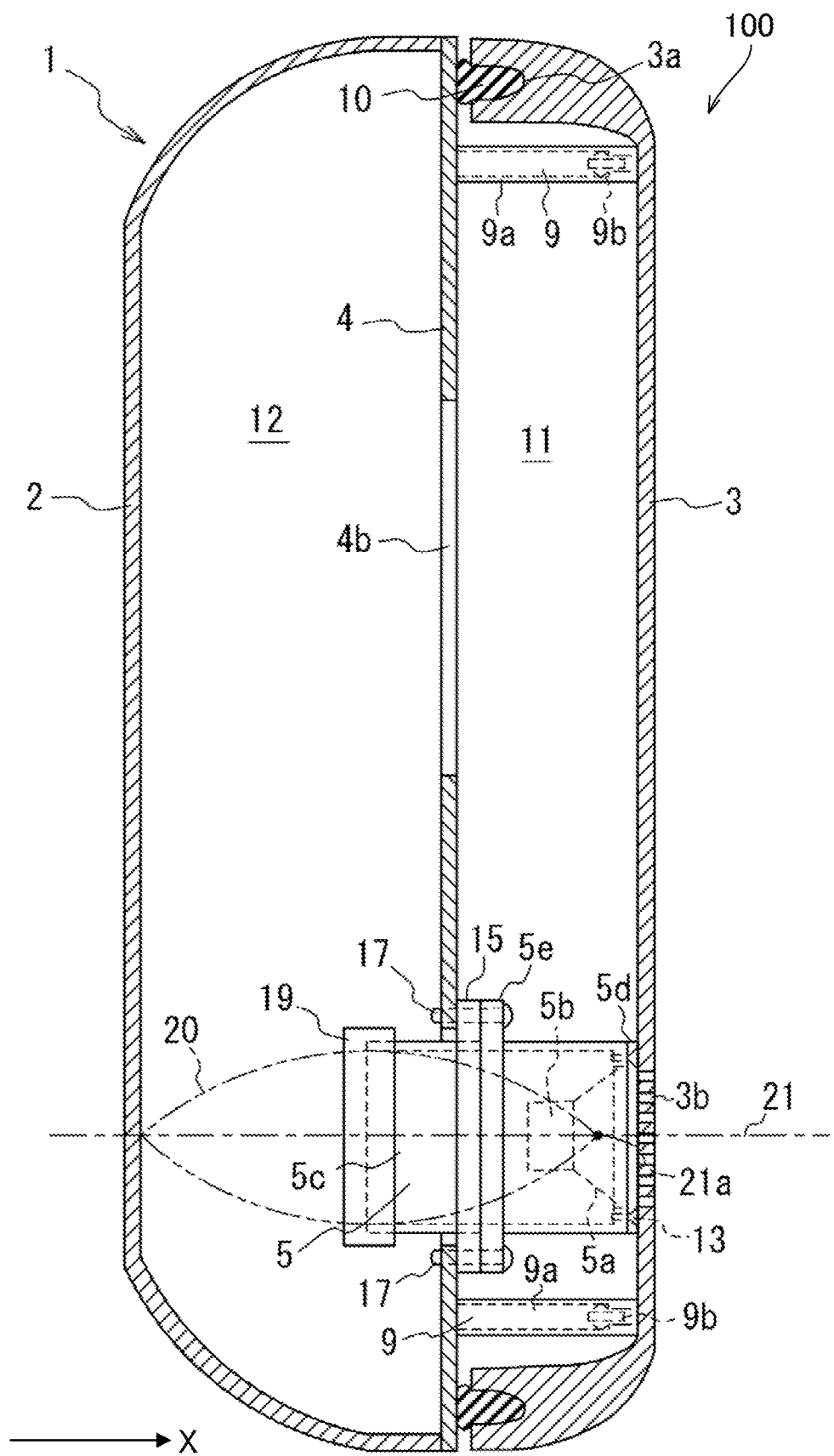
FIG. 2 is a vertical sectional view of the speaker system.
Figure 3:
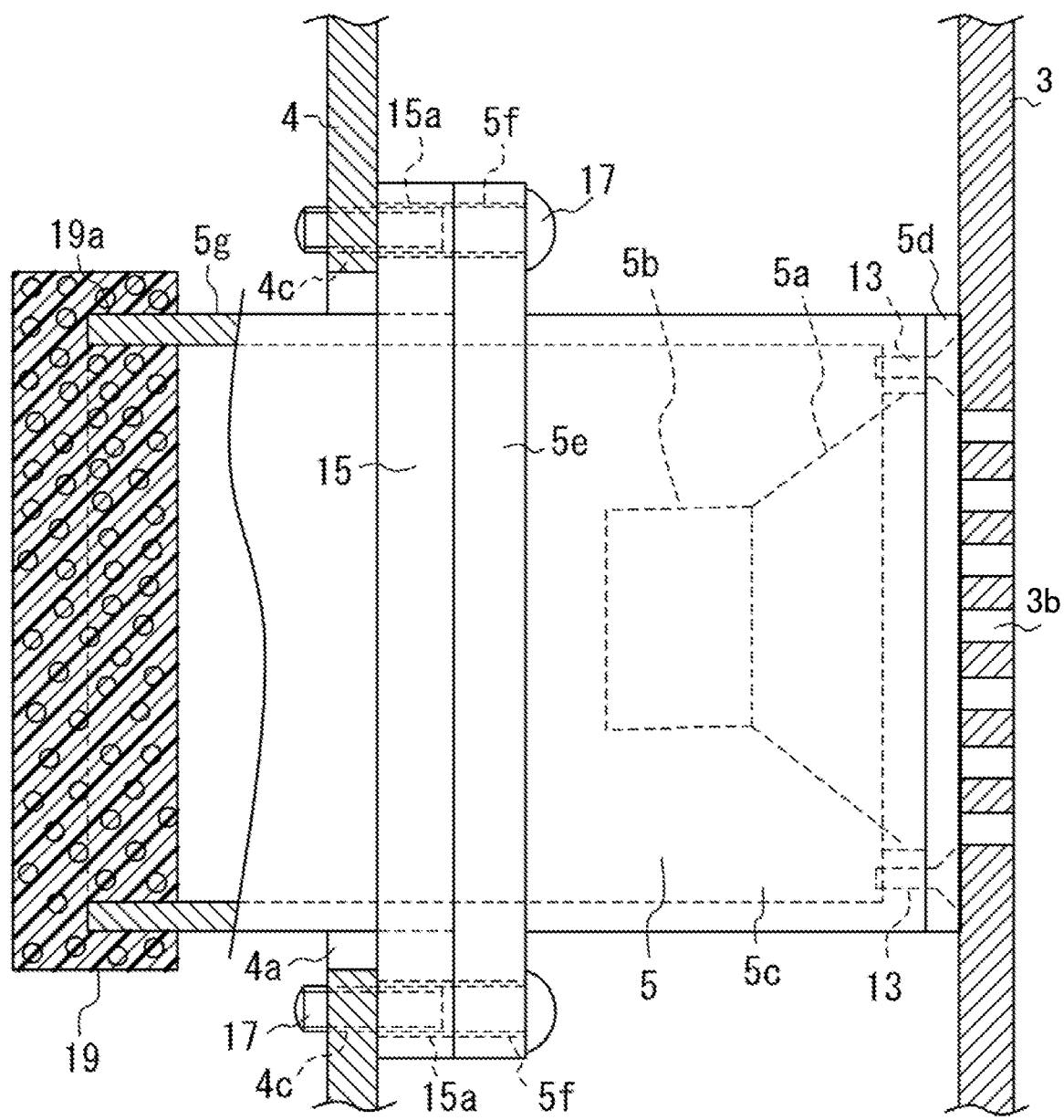
FIG. 3 is a partially expanded view of FIG. 2.

FIG. 1 is an exploded perspective view showing a configuration of a vehicle door including a speaker system according to the embodiment. FIG. 2 is a vertical sectional view of the speaker system according to the embodiment, and FIG. 3 is a partially expanded view of FIG. 2. A vehicle door 1 constitutes a part of a vehicle having a compartment. The vehicle door 1 includes a speaker system 100. The speaker system 100 includes a speaker unit 5 and an enclosure for the speaker unit 5. A part of a vehicle door 1 functions as the enclosure.

The vehicle door 1 includes a first panel 2 and a second panel 3. The first panel 2 is an outer panel that constitutes a first part of the vehicle door 1. The second panel 3 is an interior part of the vehicle door 1. The second panel 3 constitutes a second part of the vehicle door 1. The second panel 3 is situated closer to the compartment than the first panel 2. The second panel 3 is referred to as a door trim. The vehicle door 1 further includes a third panel 4 and the speaker unit 5. The third panel 4 constitutes a third part of the vehicle door 1. The third panel 4 resides between the first panel 2 and the second panel 3. The third panel 4 is referred to as an inner panel. The speaker unit 5 is mounted on the third panel 4. The speaker unit 5 includes a sound-output surface 5a that outputs sound toward the compartment. The sound-output surface 5a comprises an inner wall surface of a truncated cone-shaped diaphragm.

The first panel 2 and the third panel 4 each are typically formed from a steel plate. The first panel 2 is coupled to the third panel 4. The first panel 2 and the third panel 4 each may be formed either from an aluminum alloy or a carbon material. The second panel 3 is formed from a synthetic resin-molded plate, for example. To the first panel 2 and the third panel 4, a frame body 7 is mounted. The frame body 7 houses a window glass 6 that is vertically movable.

The third panel 4 has a through hole 4a, through holes 4b, and screw holes 4c. The speaker unit 5 is inserted into the through hole 4a. The through holes 4b are used to accommodate a door lock actuator (not shown) and a motor (not shown) for vertical movement of the window glass 6. In the embodiment, at least one of the through holes 4b is not covered by one or more parts, and a dedicated member covering the through holes 4b is not provided. The screw holes 4c are used to attach the speaker unit 5 to the third panel 4 with screws.

The second panel 3 is fixed to the third panel 4 with a plurality of coupling members 9. Each of the coupling members 9 includes a cylindrical reception member 9a and an insertion member 9b. The reception member 9a is mounted on the third panel 4. The reception member 9a has a hole. The insertion member 9b is unitarily formed with the second panel 3. The insertion member 9b has elastic properties. The insertion member 9b is reduced in diameter when the insertion member 9b is inserted into the hole of the reception member 9a. Then, the insertion member 9b returns to its original size in the reception member 9a. The second panel 3 is fixed to the third panel 4 with coupling members 9. The insertion member 9b can be pulled out from the reception member 9a when the second panel 3 is pulled in a direction toward the compartment with a strong force. Therefore, the second panel 3 can be separated from the third panel 4.

Each coupling member 9 may be any member that is used to fix the second panel 3 to the third panel 4. For example, the coupling member 9 may be a member having a reception member 9a provided on the second panel 3 and the insertion member 9b provided on the third panel 4.

A groove 3a is formed on the outer edge portion of the second panel 3. The vehicle door 1 further includes a packing 10. The packing 10 is fitted into the groove 3a. The packing 10 resides between the second panel 3 and the third panel 4, and acts to increase hermetic seal of a space 11 surrounded by the second panel 3 and the third panel 4. The space 11 communicates with a space 12 defined between the first panel 2 and the third panel 4. Specifically, at least one of the uncovered through holes 4b is used to communicate the space 11 with the space 12.

The speaker unit 5 includes a speaker body 5b, a cylindrical housing 5c and a flange 5d. The speaker body 5b includes a voice coil, a magnet, a diaphragm, and the like. The housing 5c houses the speaker body 5b. The housing 5c has a first end and a second end 5g opposite to the first end. The first end of the housing 5c is situated closer to the second panel 3 than the second end 5g of the housing 5c. The second end 5g of the housing 5c is situated closer to the first panel 2 than the first end of the housing 5c. The flange 5d is mounted on the first end of the housing 5c. In the speaker unit 5, the flange 5d is fixed to the housing 5c with screws 13.

The second panel 3 includes a region facing the sound-output surface 5a of the speaker unit 5. Openings 3b are formed in the region facing the sound-output surface 5a. Each of the openings 3b is used to output sound, which is output from the speaker unit 5, into the compartment. That is, as shown in FIG. 2, the speaker unit 5 overlaps at least one of the openings 3b in a plan view when the second panel 3 is viewed from the compartment along a central axis 21 of the speaker unit 5.

A flange 5e is arranged at a vicinity of the middle of the housing 5c in the thickness direction X of the vehicle door 1. The flange 5e has through holes 5f for mounting the speaker unit 5 on the third panel 4. An elastic member 15 resides between the speaker unit 5 and the third panel 4. The elastic member 15 is a ring-shaped member fitted on the outer periphery of the housing 5c. The elastic member 15 has through holes 15a for mounting the elastic member 15 on the third panel 4. The speaker unit 5 is mounted on the third panel 4 with the housing 5c arranged through the through hole 4a of the third panel 4. By screwing respective screws 17 through respective screw holes 4c of the third panel 4 via respective through holes 5f of the flange 5e and respective through holes 15a of the elastic member 15, the speaker unit 5 is fixed to the third panel 4. The elastic body 15 reduces or prevents sound output from the back surface of the speaker unit 5 from leaking from the housing 5c. The third panel 4 may have through holes instead of screw holes 4c. By screwing respective screws 17 through respective nuts via respective through holes 5f of the flange 5e, respective through holes 15a of the elastic member 15, and respective through holes of the third panel 4, the speaker unit 5 may be fixed to the third panel 4.

A sound absorber 19 is provided on the second end 5g of the housing 5c that is situated closer to the first panel 2 than the first end of the housing 5c. At least a portion of the sound absorber 19 is provided between the first panel 2 and a portion opposite to the sound-output surface 5a in the speaker unit 5. The sound absorber 19 has a first surface and a second surface opposite to the first surface. The first surface of the sound absorber 19 is situated closer to the first panel 2 than the second surface of the sound absorber 19. In the vehicle door 1, standing waves are generated in a space defined between the speaker unit 5 and the first panel 2 due to sound output from the speaker unit 5. The two-dot chain line 20 in FIG. 2 indicates the particle velocity in the primary standing wave when it is assumed that the sound absorber 19 is omitted.

In this example, the sound absorber 19 is arranged at a location between the first panel 2 and the third panel 4, that is, a location corresponding to an anti-node of the particle velocity in the primary standing wave that is generated in a space between a part of the speaker unit 5 and the first panel 2. The location corresponding to the anti-node of the particle velocity is between the first surface of the sound absorber 19 and the second surface of the sound absorber 19.

The anti-node of the particle velocity in the standing wave refers to a location at which the vibration velocity of particles vibrating in accordance with the propagation of sound wave (compression wave) is the maximum. The anti-node of the particle velocity in the standing wave corresponds to the node in which a change in sound pressure is the smallest in distribution of sound pressure.

Specifically, the sound absorber 19 is arranged in a vicinity of a middle point between the first panel 2 and a point sound source 21a equivalent to a source of the sound output by the speaker unit 5 toward the compartment. Sound output from the speaker unit 5 is generated by vibration of the sound-output surface 5a. The point sound source 21a equivalent to a source of the sound output by the speaker unit 5 toward the compartment means a position of a virtual point sound source on the assumption that the sound from the speaker unit 5 is output from the virtual point sound source.

In this embodiment, the sound absorber 19 is attached to the housing 5c of the speaker unit 5. In this example, the sound absorber 19 is formed of a porous material. The porous material is, for example, a synthetic resin foam material. The sound absorber 19 has a disc shape. The sound absorber 19 has the second surface with a groove 19a. The sound absorber 19 is attached to the housing 5c with the second end 5g of the housing 5c fitted into the groove 19a. The sound absorber 19 may be attached to the housing 5c with an adhesive disposed between the sound absorber 19 and the housing 5c. The sound absorber 19 may be attached to the housing 5c by screw, rivet, or by other known ways of fixing. The sound absorber 19 may be formed of a non-woven fabric, or a film, instead of a foam material. The speaker unit 5 has a surface facing the second panel 3. In a situation in which the speaker unit 5 is attached to the third panel 4 and in which the second panel 3 is attached to the third panel 4, the surface of the speaker unit 5 facing the second panel 3 is in contact with or close to the second panel 3, and the sound-output surface 5a faces the openings 3b.

As described above, the speaker system 100 according to this embodiment includes the sound absorber 19 arranged at a location corresponding to an anti-node of the particle velocity 20 in a standing wave. Therefore, the sound absorber 19 can efficiently reduce or prevent a standing wave from being generated due to the speaker unit 5, thereby improving the sound quality.

In this embodiment, the space 12 defined between the first panel 2 and the third panel 4 is communicated with the space 11 defined between the second panel 3 and the third panel 4 via at least one of the uncovered through holes 4b. Thus, the space in the enclosure for the speaker unit 5 includes each of the spaces 11 and 12. Therefore, compared to a conventional speaker system in which the space in the enclosure consists of only the space 12, an area volume of the enclosure (cabinet) in the speaker system 100 increases. As a result, the lowest resonance frequency can be further lowered, and consequently, a sound pressure across a low sound range can be increased. However, the present disclosure can also be applied to a configuration in which the space 11 is isolated from the space 12.

The through holes 4b of the third panel 4 may be covered with a synthetic resin film or the like. Such a film causes minimal transmission loss in the low sound range. Thus, even when each of the through holes 4b is covered by the film, for practical purposes, the space surrounded by the first panel 2 and the second panel 3 functions as an integral enclosure space, particularly in the low sound range.

Figure 4:
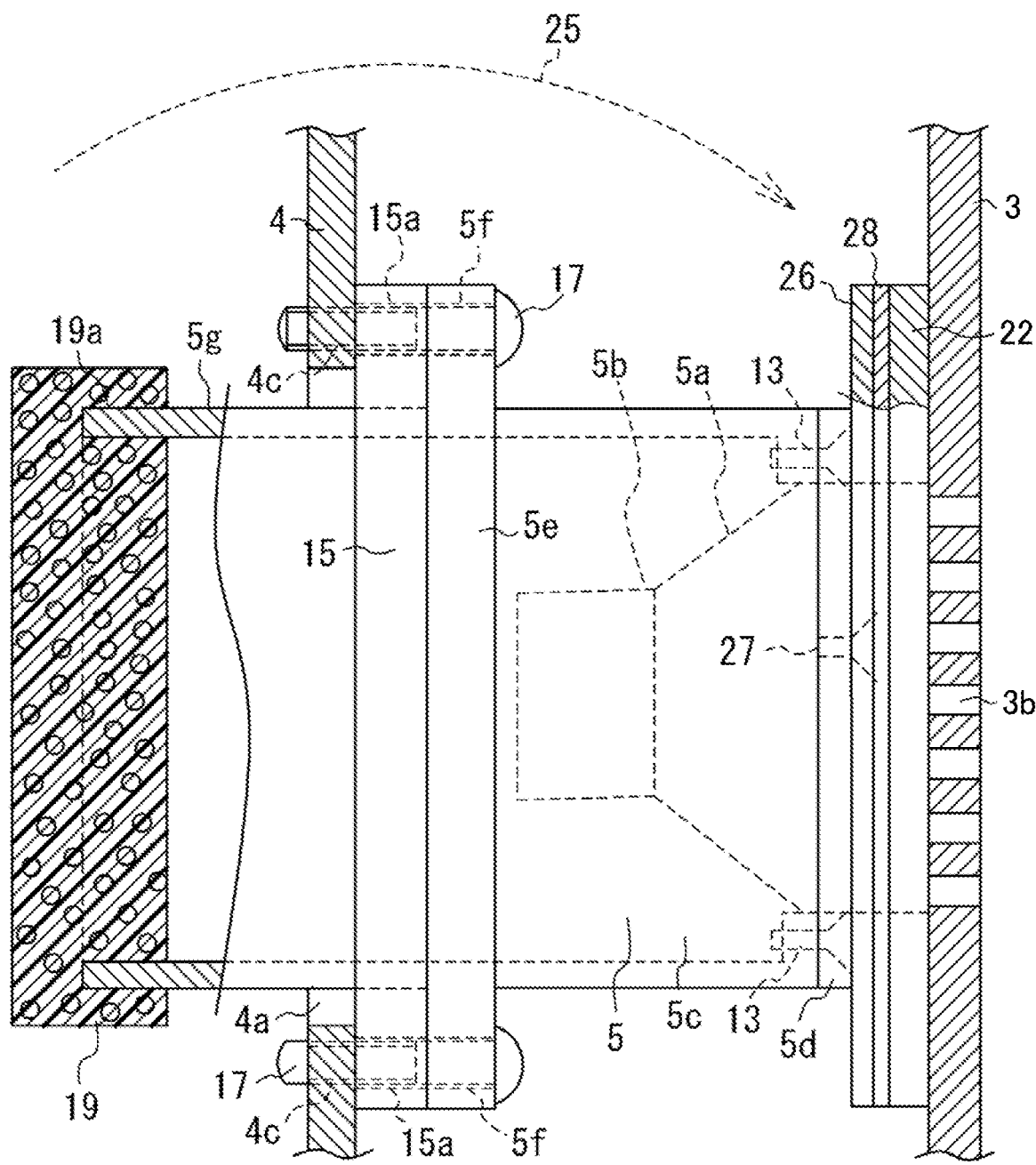
FIG. 4 is a vertical sectional view of another configuration of a speaker system.

FIG. 4 shows a vehicle door further having a ring-shaped elastic member 22 that seals a gap between the speaker unit 5 and the second panel 3. The elastic member 22 is mounted on the first end of the speaker unit 5, that is, on the periphery of the sound-output surface 5a. The elastic body 22 may be formed of an elastic material such as expandable rubber, or an expandable synthetic resin foam material.

In this example, a ring-shaped attachment plate 26 for providing the elastic member 22 is attached to the flange 5d of the speaker unit 5 with screws 27. The elastic member 22 is attached to the attachment plate 26 of the speaker unit 5 with an adhesive 28. To attach the elastic member 22, the elastic member 22 may be attached to the flange 5d having a larger radial size than that of the housing 5c.

When the second panel 3 is fixed to the third panel 4 in a situation in which the elastic member 22 is attached to the speaker unit 5, the elastic member 22 is sandwiched between the speaker unit 5 and the second panel 3. Therefore, the elastic member 22 seals the gap between the speaker unit 5 and the second panel 3. The openings 3b for outputting sound are located in an area surrounded by the elastic member 22 in a plan view when the speaker unit 5 is viewed from the compartment along the central axis 21.

In the configuration in FIG. 4, the elastic member 22 is sandwiched between the speaker unit 5 and the second panel 3. Due to an elastic deformation of the elastic member 22, a positioning error of the speaker unit 5 is allowed to some extent. Therefore, the speaker unit 5 can be easily positioned. Furthermore, as shown by a dotted line 25, the elastic member 22 can reduce or prevent sound output from the back surface of the speaker unit 5 from traveling to a space facing the sound-output surface 5a of the speaker unit 5. Thus, the elastic member 22 can reduce or prevent a situation in which sound output from the sound-output surface 5a of the speaker unit 5 is affected by sound output from the back surface of the speaker unit 5, thereby reducing or preventing a decrease in sound quality. Therefore, it is possible to easily obtain the sound itself output from the sound-output surface 5a of the speaker unit 5, thereby improving sound quality. Instead of the elastic member 22 being attached to the speaker unit 5, it may be attached to the second panel 3 so that the elastic member 22 is sandwiched between the second panel 3 and the speaker unit 5.

Figure 5:
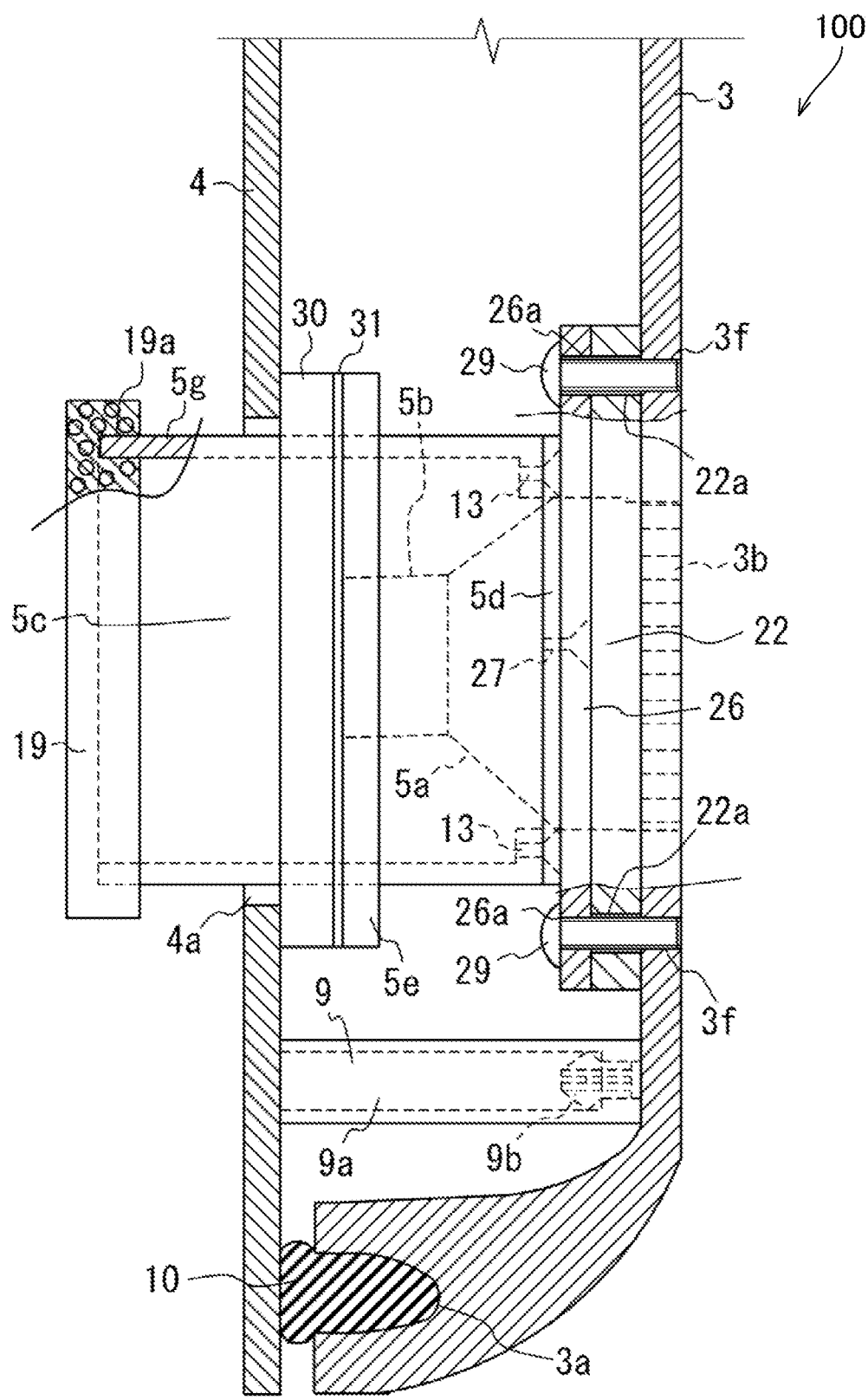
FIG. 5 is a vertical sectional view of a speaker system.

FIG. 5 shows an embodiment of the speaker system 100. In this embodiment, the speaker unit 5 is mounted on the second panel 3. In this embodiment, a ring-shaped attachment plate 26 is attached to the flange 5d of the speaker unit 5 with screws 27. The second panel 3 has screw holes 3f. The attachment plate 26 has through holes 26a. The elastic member 22 has through holes 22a. By screwing respective ones of screws 29 through respective ones of the screw holes 3f of the second panel 3 via respective ones of the through holes 26a of the attachment plate 26 and respective ones of the through holes 22a of the elastic member 22, the speaker unit 5 is fixed to the second panel 3.

In this embodiment, the flange 5e is provided to the housing 5c of the speaker unit 5. A ring-shaped elastic member 30 is fixed to the flange 5e with an adhesive 31. The elastic member 30 is sandwiched between the flange 5e and the third panel 4. The second end 5g of the housing 5c is inserted into the through hole 4a of the third panel 4. The elastic member 30 prevents sound output from the back surface of the speaker unit 5 from traveling to the space 11 via the through hole 4a. The sound absorber 19 is attached to the second end 5g of the housing 5c.

As with the sound absorber 19 in FIG. 2, the sound absorber 19 in this embodiment is arranged at a location between the first panel 2 and the third panel 4, that is, a location of an anti-node of particle velocity in a standing wave. Therefore, similarly to in the previous embodiment, generation of a standing wave can be restrained and the sound quality can be improved. Furthermore, the elastic member 22 is provided between the speaker unit 5 and the second panel 3. Therefore, as well as in the example of FIG. 4, it is possible to reduce or prevent sound output from the back surface of the speaker unit 5 from traveling to the sound-output surface 5a, thereby improving the sound quality.

Furthermore, in this embodiment, the speaker unit 5 is attached to the second panel 3. Thus, the speaker unit 5 may be attached to the second panel 3 before the second panel 3 is attached to the third panel 4. Therefore, an advantage is obtained in that assembly of the speaker system 100 can be easily achieved by mounting the second panel 3 to the third panel 4.

The elastic member 30, which is provided between the flange 5e of the housing 5c and the third panel 4, may be attached to the flange 5e with a screw, rivet, or by other known ways of fixing. The elastic member 30 may be fixed to the third panel 4.

In each of the above-described embodiments, the sound absorber 19 is arranged at a location of an anti-node of particle velocity in the primary standing wave. The location of the anti-node of the particle velocity in the primary standing wave is substantially identical to a location of an anti-node of particle velocity in the third or higher odd-numbered orders of standing waves. Therefore, the sound absorber 19 can reduce or prevent generation of the third or higher odd-numbered orders of standing waves.

The above embodiments can be modified in various ways. Specific modifications will be exemplified below. Two or more aspects freely selected from the following examples may be appropriately combined as long as they do not conflict with each other.

(1) In addition to the sound absorber 19 described above, another sound absorber may be provided between the sound absorber 19 and the first panel 2 or between the sound absorber 19 and the point 21a shown in FIG. 2. This configuration can reduce or prevent generation of even-numbered orders of standing waves, thereby further improving the sound quality.

(2) Another sound absorber 19 may be attached to the third panel 4.

(3) The sound absorber 19 is attached to the housing 5c of the speaker unit 5. However, the present disclosure is not limited to the sound absorber 19 attached to the housing 5c. The manner in which the sound absorber 19 is provided at the vehicle door 1 is not limited as long as the sound absorber 19 is arranged at a location corresponding to an anti-node of particle velocity in a standing wave that is generated in a space defined between a part of the speaker unit 5 and the first panel 2. For example, the speaker body 5b may be coupled to the sound absorber 19 with a member.

Aspects Understood Based on Least One of the Embodiments and the Modifications

The following aspect is understood based on at least one of the embodiments and the modifications described above. One aspect of the speaker system includes a first panel being an outer panel that constitutes a first part of a vehicle door of a vehicle having a compartment, a second panel that constitutes a second part of the vehicle door, the second panel being situated closer to the compartment than the first panel and having an opening for outputting sound, a third panel that constitutes a third part of the vehicle door, the third panel residing between the first panel and the second panel, a speaker unit that overlaps the opening in a plan view when viewed from the compartment along a central axis of the speaker unit, the speaker unit outputting sound toward the compartment, and a sound absorber that is arranged at a location corresponding to an anti-node of particle velocity in a standing wave that is generated in a space between the speaker unit and the first panel. According to this aspect, the sound absorber is arranged at a location corresponding to an anti-node of particle velocity in a standing wave. Therefore, generation of a standing wave can be efficiently reduced or prevented. As a result, it is possible to reduce or prevent a decrease in the pressure of sound components, having a frequency identical to the frequency of a standing wave, in sound output to a compartment. In addition, when a speaker unit receives an input signal that includes frequency components of a standing wave up to a certain point in time, but that no longer includes the frequency components of the standing wave after the certain point, the frequency components of the standing wave in sound output based on the signal immediately attenuate after the certain point. Therefore, according to this aspect, sound quality can be improved.

In another aspect of the speaker system described above, the sound absorber is arranged at a vicinity of a middle point between the first panel and a virtual point sound source equivalent to a source of the sound output by the speaker unit toward the compartment. According to this aspect, generation of a standing wave can be reduced or prevented efficiently, and sound quality can be further improved.

In still another aspect of the speaker system described above, the sound absorber is formed of a porous material. According to this aspect, since the sound absorber is formed of a porous material, it is possible to efficiently absorb sound, reduce the weight of the sound absorber, and facilitate attachment of the sound absorber.

In still another aspect of the speaker system described above, the speaker unit includes a speaker body, and a cylindrical housing that houses the speaker body. The cylindrical housing has an end facing the first panel via the sound absorber. The sound absorber is attached to the end of the housing. According to this aspect, the sound absorber is attached to the cylindrical housing. The sound absorber can be attached to a speaker system along with attachment of the speaker unit with the sound absorber to the second panel or the third panel. Therefore, the assembly process for the speaker system is simplified.

In still another aspect of the speaker system described above, the speaker unit is fixed to the third panel. The speaker unit is mounted on the third panel typically having a high rigidity, such as one of metal. According to this aspect, the speaker unit can be mounted easily.

In still another aspect of the speaker system described above, the speaker unit is fixed to the second panel. According to this aspect, when the speaker unit is attached to the second panel in advance, an advantage is obtained in that assembly of the speaker system can be easily achieved by providing the speaker unit at the vehicle door.

One aspect of a vehicle door includes any one of the speaker systems described above. According to this aspect, the effects caused by the system described above can be obtained.

The foregoing disclosure has been set forth merely to illustrate the embodiments of the invention and is not intended to be limiting. Since modifications of the disclosed embodiments incorporating the spirit and substance of the invention may occur to persons having ordinary skill in the art, the invention should be construed to include everything within the scope of the appended claims and equivalents thereof.

DESCRIPTION OF REFERENCE SIGNS

1 . . . vehicle door, 2 . . . first panel, 3 . . . second panel, 4 . . . third panel, 5 . . . speaker unit, 5a . . . sound-output surface, 5b . . . speaker body, 5c . . . housing, 19 . . . sound absorber, 20 . . . particle velocity in standing wave, 21 . . . central axis, 21a . . . point indicative of a position of a point sound source equivalent to a speaker unit that outputs sound toward compartment, 100 . . . speaker system.

What is claimed is:

1. A speaker system comprising:
 a first panel being an outer panel of a vehicle door of a vehicle;
 a second panel being a panel of the vehicle door, the second panel facing a compartment of the vehicle and having an opening for outputting sound;
 a third panel disposed between the first panel and the second panel, the third panel having an opening;
 a speaker unit that overlaps the opening for outputting sound in a plan view when viewed from the compartment along a central axis of the speaker unit, the speaker unit outputting sound toward the compartment, the opening for outputting sound being the opening of the second panel; and a sound absorber that is arranged at a location corresponding to an anti-node of particle velocity in a standing wave that is generated in a space between the speaker unit and the first panel, wherein the speaker unit includes a speaker body and a member coupled to the speaker body, the sound absorber is attached to an end of the member, the end facing the first panel, and a space between the first panel and the third panel communicates a space between the second panel and the third panel via the opening of the third panel, the opening of the third panel is open without being covered.

2. The speaker system according to claim 1, wherein the sound absorber is arranged near a middle point between the first panel and a virtual point sound source equivalent to a source of the sound output by the speaker unit toward the compartment.

3. The speaker system according to claim 1, wherein the sound absorber is formed of a porous material.

4. The speaker system according to claim 1, wherein:
the member is a cylindrical housing that is coupled to and houses the speaker body;
the cylindrical housing having an end facing the first panel via the sound absorber; and
the sound absorber is attached to the end of the housing.

5. The speaker system according to claim 1, wherein the speaker unit is fixed to the third panel.

6. The speaker system according to claim 1, wherein the speaker unit is fixed to the second panel.

7. A vehicle door comprising a speaker system, the speaker system comprising:

a first panel being an outer panel of a vehicle door of a vehicle;

a second panel being a panel of the vehicle door, the second panel facing a compartment of the vehicle and having an opening for outputting sound;

a third panel disposed between the first panel and the second panel, the third panel having an opening;

a speaker unit that overlaps the opening for outputting sound in a plan view when viewed from the compartment along a central axis of the speaker unit, the speaker unit outputting sound toward the compartment, the opening for outputting sound being the opening of the second panel; and a sound absorber that is arranged at a location corresponding to an anti-node of particle velocity in a standing wave that is generated in a space defined between the speaker unit and the first panel, wherein the speaker unit includes a speaker body and a member coupled to the speaker body, the sound absorber is attached to an end of the member, the end facing the first panel, and a space between the first panel and the third panel communicates a space between the second panel and the third panel via the opening of the third panel, the opening of the third panel is open without being covered.

* * * * *